United States Patent
Mühlberger et al.

(10) Patent No.: US 6,460,819 B1
(45) Date of Patent: Oct. 8, 2002

(54) AUTOMOBILE SEAT WITH INCLINATION ADJUSTER

(75) Inventors: Joachim Mühlberger, Grünstadt; Lutz Muhlack, Bad Kreuznach, both of (DE)

(73) Assignee: Keiper GmbH & Co, Kaiserslautern (DE)

( * ) Notice: Subject to any disclaimer, the term of this patent is extended or adjusted under 35 U.S.C. 154(b) by 20 days.

(21) Appl. No.: 09/658,151

(22) Filed: Sep. 8, 2000

(30) Foreign Application Priority Data

Sep. 9, 1999 (DE) .......................................... 199 42 975

(51) Int. Cl.[7] .............................................. F16M 13/00
(52) U.S. Cl. ..................................... 248/421; 297/216.1
(58) Field of Search .................................. 248/421, 422, 248/429; 297/313, 311, 339, 338, 337, 216.1, 216.13, 216.14, 216.15, 216.16

(56) References Cited

U.S. PATENT DOCUMENTS

| | | | |
|---|---|---|---|
| 3,762,505 A | * | 10/1973 | Morse |
| 4,687,251 A | * | 8/1987 | Kazaoka et al. |
| 4,781,353 A | * | 11/1988 | Nishino |
| 4,903,931 A | * | 2/1990 | Shimazaki |
| 5,310,030 A | * | 5/1994 | Kawakita et al. |
| 5,324,095 A | * | 6/1994 | Yamauchi |

\* cited by examiner

Primary Examiner—Korie Chan
(74) Attorney, Agent, or Firm—Alston & Bird LLP

(57) ABSTRACT

A vehicle seat, in particular an automobile seat, has a seat frame with a front part that is movable by means of an inclination adjuster relative to side panels of the seat frame. The inclination adjuster includes a shaft for the drive of the inclination adjuster. The shaft is arranged with a play relative to one side panel.

23 Claims, 3 Drawing Sheets

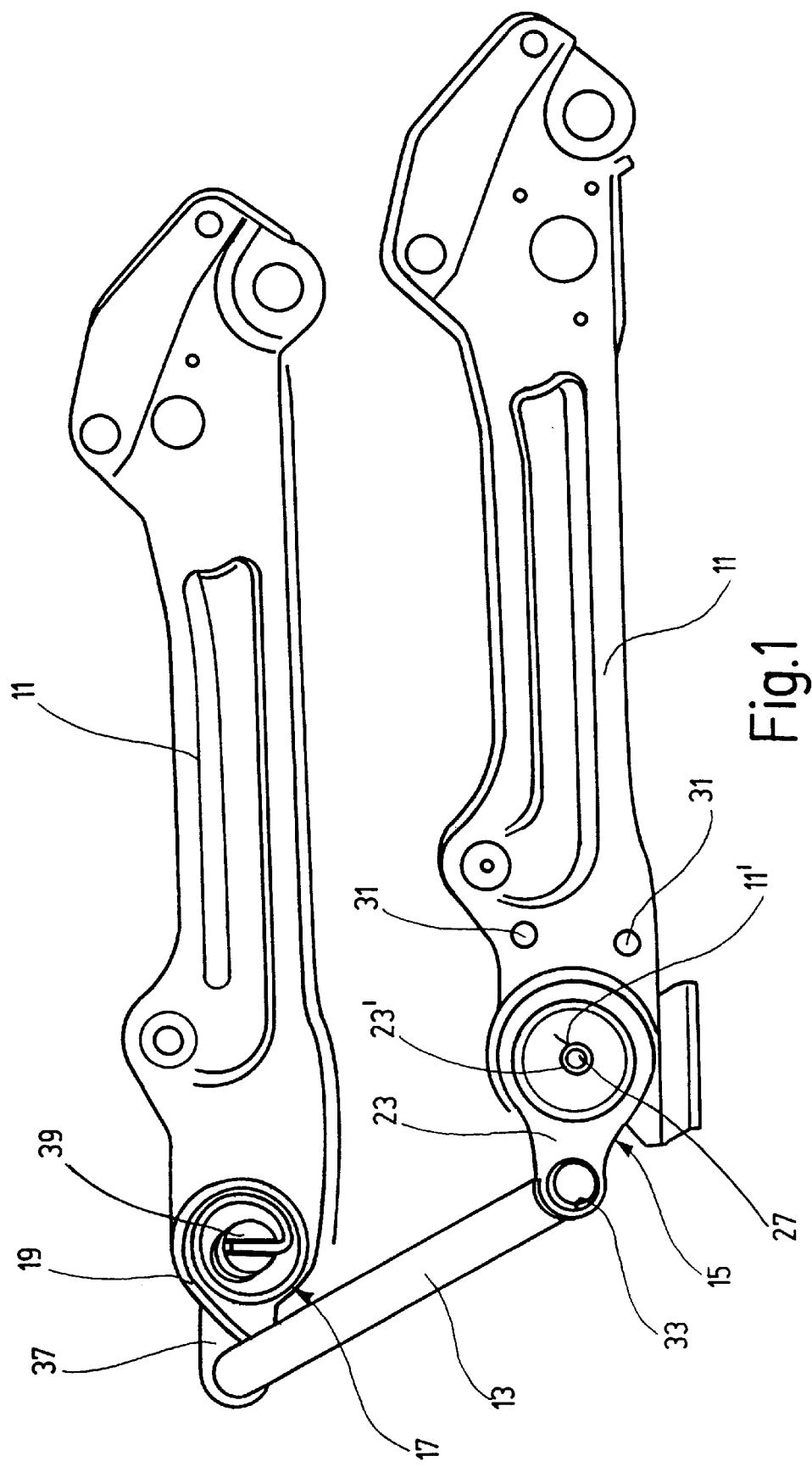

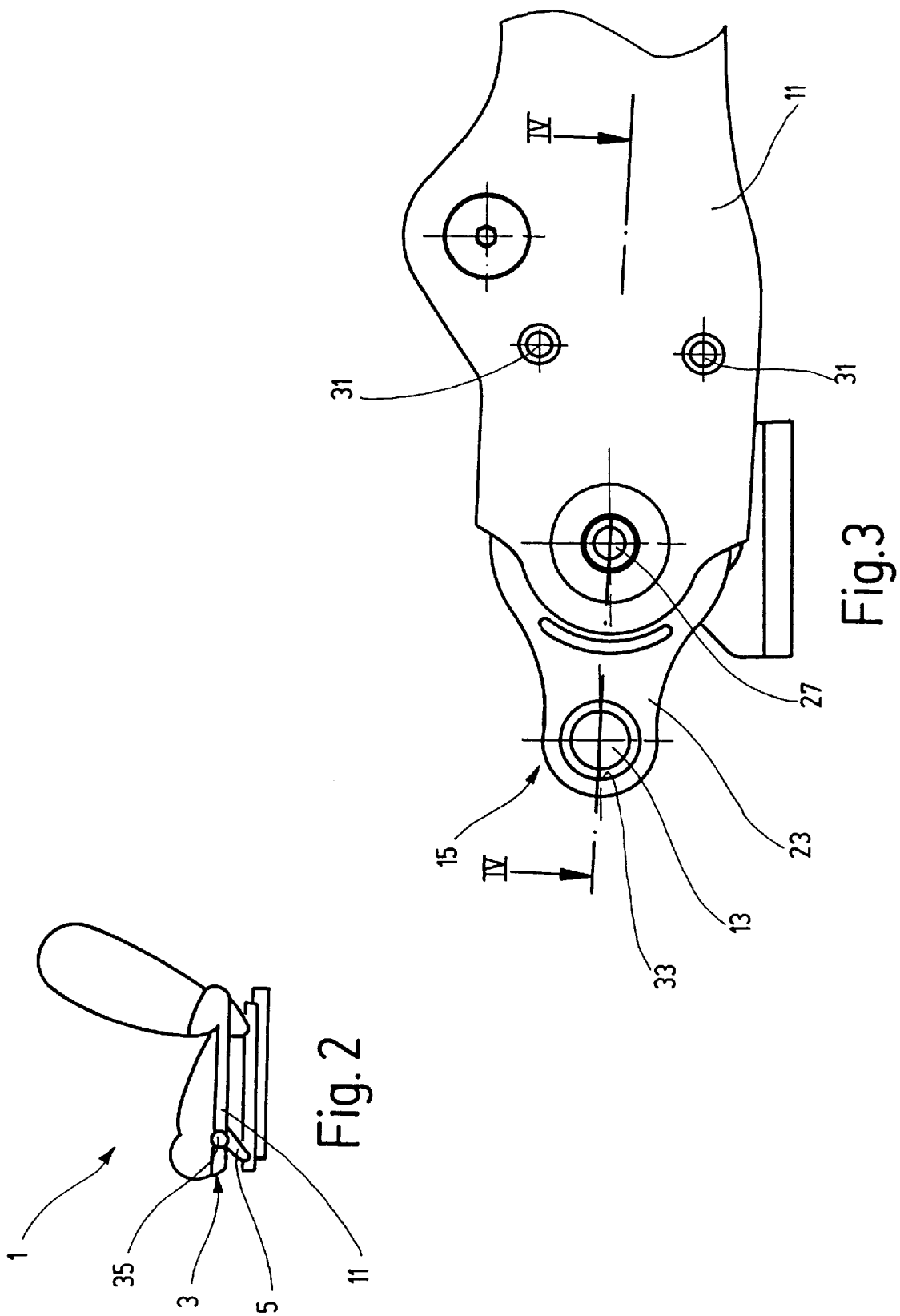

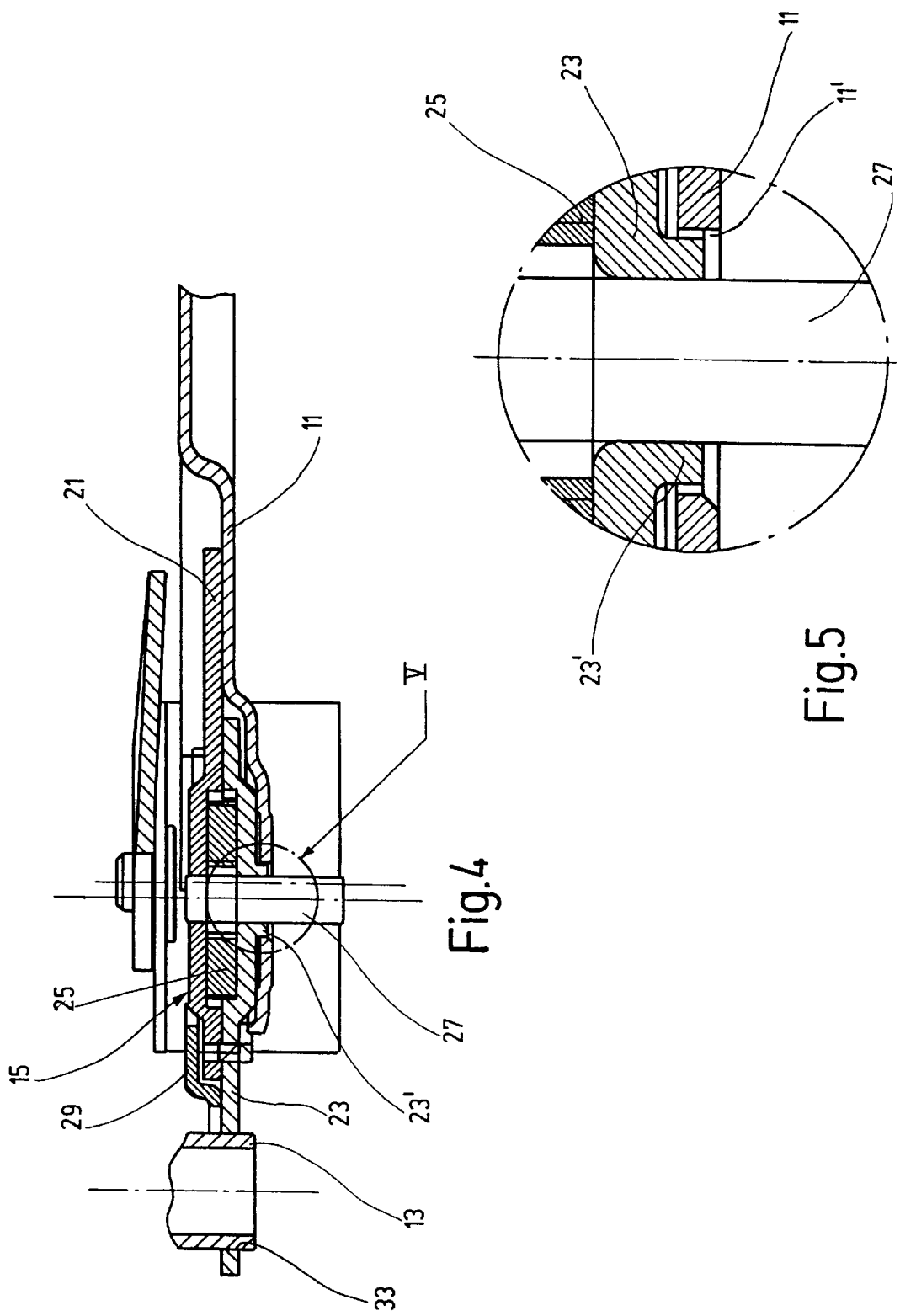

AUTOMOBILE SEAT WITH INCLINATION ADJUSTER

BACKGROUND OF THE INVENTION

The present invention relates to a vehicle seat, in particular an automobile seat, with an inclination adjuster.

In automobile seats, it is known to adjust the front part of the seat frame that mounts the part of seat that is intended for supporting the upper thighs. In this context, it is known to adjust the front part of the seat by means of an inclination adjuster relative to the part of the seat that is intended for receiving the buttocks. The inclination adjuster may be operated via a shaft by hand or by a motor.

It is an object of the present invention to improve an automobile seat having an inclination adjuster.

SUMMARY OF THE INVENTION

In accordance with one aspect of the present invention, an automobile seat that includes an inclination adjuster has a play between a shaft of the inclination adjuster and a side panel of a seat frame. More specifically and in accordance with this aspect, the automobile seat includes a seat frame having side panels that extend in a longitudinal direction and are laterally spaced apart from one another. The seat frame further includes a front part extending laterally between the side panels. The inclination adjuster is mounted to the front part of the seat frame and includes a mechanism for being operated by the shaft to adjust the elevation of the front part with respect to the side panels. Regarding the play more specifically, one of the side panels of the seat frame includes an opening that a portion of the shaft is positioned within. The opening is sized so that a gap allows the play.

As a result of arranging the shaft with a play relative to the associated side panel of the seat frame, no friction losses occur in normal use at the interface between the shaft and the associated side panel, because rotation of the shaft does not result in frictional interaction with the structure of the side panel that defines the opening. However, in the case of a crash of the vehicle containing the seat, wherein the crash is of a predetermined magnitude or greater, a transmission point for transmitting the occurring strong forces is available after a deformation. This will be especially of advantage when, in the case of a modular construction of the automobile seat, the inclination adjuster is designed and constructed as a separate subassembly, and optionally mounted to a side panel of the seat frame. This mounting can be provided, for example, via two connection points. In the case of a crash, the inclination adjuster deforms in the region of the connection points until the play in the region of the shaft disappears.

In accordance with one aspect of the present invention, the shaft is supported in a collar of the inclination adjuster, and the collar is inserted with a play through the opening of the side panel. The collar comes into contact with the side panel in the case of a crash of a predetermined magnitude or greater. When the collar comes into contact with the side panel, at least a portion of the forces resulting from the crash are directly transmitted into the side panel of the seat frame.

Preferably, the adjustment by means of the inclination adjuster occurs by a pivotal movement of the front part of the seat frame. In this instance, the inclination adjuster acts as a joint, and a further joint is provided. For example, the inclination adjuster may be designed and constructed as a double-acting reversing gear mechanism, which is easy to make, and which operates accurately. A spring may be provided to assist in the upward pivoting of the front part of the seat frame. In this instance, the use of a spiral spring has the advantage that the available assembly space is better utilized. For example, to apply the required torque, a leg spring would have to have so many winds that they would result in extending over the rocking arm of the height adjuster or the side panel of the seat frame.

BRIEF DESCRIPTION OF THE DRAWINGS

In the following, the invention is described in greater detail with reference to an embodiment illustrated in the drawings, in which:

FIG. 1 is a perspective side view of a side frame of the embodiment;

FIG. 2 is a side view of the embodiment;

FIG. 3 is a side view of an inclination adjuster;

FIG. 4 is a sectional view of FIG. 3 along line IV—IV; and

FIG. 5 is an enlarged cutout view of detail V in FIG. 4.

DETAILED DESCRIPTION OF THE INVENTION

This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

An automobile seat 1, which is designed and constructed as a driver seat of an automobile, includes a seat frame 3. The seat frame 3 is adjustable to a desired seat height by means of a height adjuster 5, which includes, for example, rocker arms. The seat frame 3 includes two side panels 11 designed and constructed in mirror symmetry, which are arranged in the longitudinal direction of the seat, and a transverse tube 13 that is arranged perpendicularly thereto at the front end of the side panels 11 of the seat frame. The transverse tube 13 extends laterally between and is joined to the side panels 11 of the seat frame via an inclination adjuster 15 on the left side of automobile seat 1, and via a joint 17 with a spiral spring 19 on the right side of the automobile seat 1. The spiral spring 19 biases transverse tube 13 in the upward direction. By actuating the inclination adjuster 15, as is described in greater detail below, it is possible to adjust the height of transverse tube 13 relative to the side panels 11 of the seat frame. The transverse tube 13 mounts a bucket with a cushion part that is used to support the upper thighs, so that it is thus possible to adjust the inclination of this part of the seat.

The inclination adjuster 15 is designed and constructed as a compact double-acting reversing gear mechanism (D6 gearing). On its inner side, it includes a plate-shaped hollow wheel frame 21, which is provided with an internal gear tooth system in a cavity that faces away from the inner side. Furthermore, the inclination adjuster 15 includes a likewise plate-shaped driven hollow wheel 23 with a further internal gear tooth system, which is formed in a cavity facing the hollow wheel frame 21 and having the same diameter as the cavity there, and whose number of teeth is smaller than that of the internal teeth of hollow wheel frame 21. A gear 25 with a slightly smaller diameter and a smaller number of teeth is arranged within the internal gear tooth systems and made so wide that it engages at one point of its circumference both internal gear tooth systems at the same time. The gear 25 is rotatable by means of an eccentric shaft 27 that projects from gear 25 perpendicularly outward. The eccentric shaft 27 is supported in a collar 23' of driven hollow wheel 23. A clamp 29, which is arranged on driven hollow wheel 23 on the inside thereof, surrounds the hollow wheel frame 21 in the axial direction and, thus, holds together the two parts 21 and 23 in the axial direction, together with the left side panel 11 of the seat frame.

At its rear end, the hollow wheel frame 21 includes two connection points 31, through which the hollow wheel frame 21 is mounted to the left side panel 11 of the seat frame, for example, by means of screws. The driven hollow wheel 23 includes at its front end a receptacle 33 for transverse tube 13. The transverse tube 13 is connected to the driven hollow wheel 23, for example, by welding. The collar 23' of driven hollow wheel 23 extends with a play through an opening 11' in the left side panel 11 of the seat frame such that it creates approximately a 0.5 mm wide air gap between adjacent surfaces of the collar and the left side panel (as illustrated in FIG. 5), and so that the eccentric shaft 27 extends outward at this point. The eccentric shaft 27 mounts a hand wheel 35 that can be manually rotated to actuate the inclination adjuster 15 by hand. Alternatively, the eccentric shaft 27 is operatively connected to an electric motor.

A side plate 37 having the outer contour of driven hollow wheel 23 is supported by means of a bearing pin 39 in an opening in the right side panel 11 of the seat frame. At its front end, the side plate 37 includes a receptacle for transverse tube 13, which is joined to side plate 37, for example, by welding. On its inward directed side, the bearing pin 39 includes a diametrically extending slot, which accommodates the inner end of spiral spring 19. The spiral spring 19 is wound about bearing pin 39. With its outer end, the spiral spring 19 extends toward transverse tube 13 and is secured thereto.

In the normal use, the user of the automobile seat 1 can adjust the inclination of the front part of the seat relative to the rear part thereof, manually by means of hand wheel 35, or power-driven by means of an electric motor that is operatively connected to the eccentric shaft 27. The eccentric shaft 27 rotates the gear 25, which rotates, subject to the difference in the number of teeth, the driven hollow wheel 23 relative to the hollow wheel frame 21. The transverse tube 13 transmits the movement of this gear mechanism to the other side of the automobile seat 1 to side plate 37. This causes transverse tube 13 to rise or to lower. The rising is assisted by spiral spring 19 and the lowering is assisted by the weight resting on the front part of the automobile seat. As the transverse tube 13 moves, the overlying part of the cushion moves along, so that the inclination of the front part of the seat is changed.

In the event of a crash, the user of automobile seat 1 pushes with his upper thighs onto the transverse tube 13. On the right side, the transverse tube 13 transmits the forces, via side plate 37 and bearing pin 39, into the right side panel 11 of the seat frame. On the left side, the transverse tube 13 transmits the forces into the driven hollow wheel 23, which in turn transmits the forces first via gear 25, hollow wheel frame 21, and connection points 31 into the left side panel 11 of the seat frame. The side panels 11 of the seat frame transmit the forces via height adjuster 5 in the direction of the automobile structure.

In the case of the configuration of the inclination adjuster 15 according to the invention, the driven hollow wheel 23 provides a second way of retransmitting forces. In the event of a crash, the load increases to a peak value (e.g., a predetermined value), which corresponds to a multiple of the normal load. As the predetermined load is achieved, the material of the hollow wheel frame 21 with connection points 31 deforms under the load of the transmitted crash forces. As soon as this deformation occurs, the play between collar 23' of driven hollow wheel 23 and the edge of opening 11' of the left side panel 11 of the seat frame decreases, until the collar 23' comes into contact with the side panel 11 of the seat frame. Thereafter, a major part of the forces is transmitted from the driven hollow wheel 23 into the side panel 11 of the seat frame, which protects the inclination adjuster and the electric motor, which may be connected thereto, including the gear mechanism. The connection points 31 are now subjected to less stress, but still to a greater extent than in the normal use.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. Vehicle seat that is adjustable, comprising:
    a seat frame including side panels that extend in a longitudinal direction and are laterally spaced apart from one another, and a front part extending laterally between the side panels; and
    an inclination adjuster mounted to the front part of the seat frame and including a mechanism for being operated to move the front part of the seat frame relative to the side panels of the seat frame to adjust the elevation of the front part with respect to the side panels, and the inclination adjuster further includes a laterally extending shaft for being rotated to operate the mechanism;
    wherein a first one of the side panels includes an opening that a portion of the shaft is positioned within, and the opening is sized so that a gap, which is partially defined by structure of the first side panel that defines the opening, allows play between the shaft and the first side panel, and
    wherein the inclination adjuster further includes a collar that supports the shaft, and the collar extends into the opening so that the gap is defined between the collar and the structure of the first side panel that defines the opening.

2. Vehicle seat of claim 1, wherein the inclination adjuster is designed and constructed as a separate subassembly of the vehicle seat, and the inclination adjuster is mounted to the first side panel.

3. Vehicle seat of claim 2, wherein the inclination adjuster includes connection points that secure the inclination adjuster to the first side panel.

4. Vehicle seat of claim 3, wherein the inclination adjuster is constructed so that the inclination adjuster deforms in the region of the connection points in the event of a crash of a predetermined magnitude or greater.

5. Vehicle seat of claim 3, further comprising a joint pivotably connecting the front part to a second one of the side panels, and wherein the inclination adjuster operates as a joint that pivotably connects the front part to the first side panel.

6. Vehicle seat of claim 4, further comprising a joint pivotably connecting the front part to a second one of the side panels, and wherein the inclination adjuster operates as a joint that pivotably connects the front part to the first side panel.

7. Vehicle seat of claim 1, wherein the vehicle seat is constructed so that in the event of a crash of a predetermined magnitude or greater, the collar of the inclination adjuster comes into contact with the structure of the first side panel that defines the opening.

8. Vehicle seat of claim 7, further comprising a joint pivotably connecting the front part to a second one of the side panels, and wherein the inclination adjuster operates as a joint that pivotably connects the front part to the first side panel.

9. Vehicle seat of claim 1, further comprising a joint pivotably connecting the front part to a second one of the side panels, and wherein the inclination adjuster operates as a joint that pivotably connects the front part to the first side panel.

10. Vehicle seat of claim 9, wherein the inclination adjuster is operative for pivoting the front part of the seat frame relative to the side panels of the seat frame, and wherein the vehicle seat further comprises a spring mounted for assisting in the pivoting of the front part of seat frame.

11. Vehicle seat of claim 10, wherein the spring is a spiral spring.

12. Vehicle seat of claim 1, wherein the mechanism of the inclination adjuster is a double-acting reversing gear mechanism.

13. Vehicle seat of claim 1, wherein the gap is approximately 0.5 mm wide.

14. Vehicle seat of claim 1, wherein the inclination adjuster is connected to the first side panel, and the vehicle seat is constructed so that deformation occurs in a crash of a predetermined magnitude or greater and the deformation results in movement of the shaft relative to the first side panel so that the size of the gap changes.

15. Vehicle seat of claim 1, wherein the collar coaxially supports the shaft.

16. Vehicle seat of claim 1, wherein a portion of the gap is defined between a portion of the shaft that is positioned within the opening and a portion of the first side panel.

17. Vehicle seat that is adjustable, comprising:
a seat frame including side panels that extend in a longitudinal direction and are laterally spaced apart from one another, and a front part extending laterally between the side panels; and
an inclination adjuster mounted to the front part of the seat frame and including a mechanism for being operated to move the front part of the seat frame relative to the side panels of the seat frame to adjust the elevation of the front part with respect to the side panels, and the inclination adjuster further includes a laterally extending shaft for being rotated to operate the mechanism, wherein the inclination adjuster is designed and constructed as a separate subassembly of the vehicle seat and is mounted to the first side panel by way of connection points that secure the inclination adjuster to the first side panel, and the inclination adjuster is constructed so that the inclination adjuster deforms in the region of the connection points in the event of a crash of a predetermined magnitude or greater;
wherein a first one of the side panels includes an opening that a portion of the shaft is positioned within, and the opening is sized so that a gap, which is partially defined by structure of the first side panel that defines the opening, allows play between the shaft and the first side panel.

18. Vehicle seat of claim 17, wherein the inclination adjuster further includes a collar that coaxially supports the shaft, and the collar extends into the opening so that the gap is defined between the collar and the structure of the first side panel that defines the opening.

19. Vehicle seat of claim 17, further comprising a joint pivotably connecting the front part to a second one of the side panels, and wherein the inclination adjuster operates as a joint that pivotably connects the front part to the first side panel.

20. Vehicle seat that is adjustable, comprising:
a seat frame including side panels that extend in a longitudinal direction and are laterally spaced apart from one another, and a front part extending laterally between the side panels;
an inclination adjuster mounted to the front part of the seat frame and including a mechanism for being operated to move the front part of the seat frame relative to the side panels of the seat frame to adjust the elevation of the front part with respect to the side panels, and the inclination adjuster further includes a laterally extending shaft for being rotated to operate the mechanism, wherein the inclination adjuster operates as a joint that pivotably connects the front part to a first one of the side panels, and the inclination adjuster is operative for pivoting the front part of the seat frame relative to the side panels of the seat frame;
a joint pivotably connecting the front part to a second one of the side panels; and
a spring mounted for assisting in the pivoting of the front part of seat frame;
wherein the first side panel includes an opening that a portion of the shaft is positioned within, and the opening is sized so that a gap, which is partially defined by structure of the first side panel that defines the opening, allows play between the shaft and the first side panel.

21. Vehicle seat of claim 20, wherein the spring is a spiral spring.

22. Vehicle seat that is adjustable, comprising:
a seat frame including side panels that extend in a longitudinal direction and are laterally spaced apart from one another, and a front part extending laterally between the side panels; and
an inclination adjuster mounted to the front part of the seat frame and including a mechanism for being operated to move the front part of the seat frame relative to the side panels of the seat frame to adjust the elevation of the front part with respect to the side panels, and the inclination adjuster further includes a laterally extending shaft for being rotated to operate the mechanism;
wherein a first one of the side panels includes an opening that a portion of the shaft is positioned within, and the opening is sized so that a gap, which is partially defined by structure of the first side panel that defines the opening, allows play between the shaft and the first side panel, and
wherein the inclination adjuster is connected to the first side panel, and the vehicle seat is constructed so that deformation occurs in a crash of a predetermined magnitude or greater and the deformation results in movement of the shaft relative to the first side panel so that the size of the gap changes.

23. Vehicle seat of claim 22, further comprising a joint pivotably connecting the front part to a second one of the side panels, and wherein the inclination adjuster operates as a joint that pivotably connects the front part to the first side panel.

* * * * *